US009739342B2

(12) United States Patent
Shibano et al.

(10) Patent No.: US 9,739,342 B2
(45) Date of Patent: Aug. 22, 2017

(54) ENGINE BALANCE SHIFT

(71) Applicant: SUZUKI MOTOR CORPORATION, Hamamatsu-shi, Shizuoka (JP)

(72) Inventors: Ken Shibano, Hamamatsu (JP); Kunihiko Hiraoka, Hamamatsu (JP); Takenori Muramatsu, Hamamatsu (JP); Hidekuni Ota, Hamamatsu (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 115 days.

(21) Appl. No.: 14/509,207

(22) Filed: Oct. 8, 2014

(65) Prior Publication Data
US 2015/0113984 A1    Apr. 30, 2015

(30) Foreign Application Priority Data
Oct. 25, 2013    (JP) .................. 2013-222363

(51) Int. Cl.
*F02B 33/44*    (2006.01)
*F16F 15/26*    (2006.01)
(Continued)

(52) U.S. Cl.
CPC ............ *F16F 15/264* (2013.01); *F01N 13/08* (2013.01); *F01N 13/1805* (2013.01);
(Continued)

(58) Field of Classification Search
CPC .... F16F 15/264; F01N 13/08; F01N 13/1805; F01N 2590/04; F02B 61/02; F02B 29/04; F02B 75/06; Y02T 10/146
(Continued)

(56) References Cited

U.S. PATENT DOCUMENTS

2004/0244757 A1    12/2004    Takeuchi
2006/0283418 A1*   12/2006    Matsuda ................. F02B 75/20
                                                   123/197.1
(Continued)

FOREIGN PATENT DOCUMENTS

EP    2031210 A2    3/2009
EP    2031211 A2    3/2009
(Continued)

OTHER PUBLICATIONS

Office Action dated Jul. 7, 2016 of the corresponding German application No. 102014115450.9.
(Continued)

*Primary Examiner* — Phutthiwat Wongwian
*Assistant Examiner* — Thomas Olszewski
(74) *Attorney, Agent, or Firm* — Troutman Sanders LLP

(57) ABSTRACT

A motorcycle has a crankcase containing a crank shaft and a balancer shaft, and a cylinder and a cylinder head positioned above the crankcase, and an exhaust pipe extends from the cylinder head. The balancer shaft is positioned in front of the crank shaft, and the crankcase has a balancer shaft housing supporting the balancer shaft thereinside, and has a recessed part depressed rearward in a front end center part of the balancer shaft housing. The balancer shaft has balancer shaft weights apart from each other in one side and in the other side in an axis direction.

4 Claims, 12 Drawing Sheets

(51) Int. Cl.
*F01N 13/08* (2010.01)
*F02B 61/02* (2006.01)
*F02M 35/16* (2006.01)
*F01N 13/18* (2010.01)
*F02B 29/04* (2006.01)
*F02B 75/06* (2006.01)

(52) U.S. Cl.
CPC .............. *F02B 29/04* (2013.01); *F02B 61/02* (2013.01); *F02M 35/162* (2013.01); *F01N 2590/04* (2013.01); *F02B 75/06* (2013.01); *Y02T 10/146* (2013.01)

(58) Field of Classification Search
USPC ........................................................ 60/605.1
See application file for complete search history.

(56) References Cited

U.S. PATENT DOCUMENTS

| | | | | |
|---|---|---|---|---|
| 2007/0056549 | A1* | 3/2007 | Fujiki | ................... F01M 11/10 123/195 C |
| 2010/0059011 | A1* | 3/2010 | Koyama | ................. F02B 75/06 123/192.2 |
| 2013/0098327 | A1* | 4/2013 | Ryu | ........................ F02B 75/06 123/192.2 |

FOREIGN PATENT DOCUMENTS

| | | |
|---|---|---|
| EP | 2031275 A2 | 3/2009 |
| EP | 2031278 A2 | 3/2009 |
| EP | 2039910 A2 | 3/2009 |
| EP | 2674641 A2 | 12/2013 |
| JP | S57126721 A | 8/1982 |
| JP | S6139627 U | 3/1986 |
| JP | H0216330 A | 1/1990 |
| JP | 2005-016511 | 1/2005 |
| JP | 2009074676 A | 4/2009 |
| JP | 2010059928 A | 3/2010 |
| JP | 2012140965 A | 7/2012 |

OTHER PUBLICATIONS

Office Action dated Aug. 24, 2016 of the corresponding Chinese application No. 201410566971.2.

Office Action dated Apr. 25, 2017 of the corresponding Japanese application No. 2013-222363.

\* cited by examiner

ENGINE BALANCE SHIFT

CROSS-REFERENCE TO RELATED APPLICATIONS

This application is based upon and claims the benefit of priority of the prior Japanese Patent Application No. 2013-222363, filed on Oct. 25, 2013, the entire contents of which are incorporated herein by reference.

BACKGROUND OF THE INVENTION

Field of the Invention

The present invention relates to a motorcycle, in particular to a motorcycle which has an engine that has a crankcase containing a crankshaft and a balancer shaft, and a cylinder positioned above the crankcase.

Description of the Related Art

In a vehicle such as a motorcycle, as a technique to suppress vibration of an engine being an internal combustion chamber, there is used a balancer shaft rotating in a direction opposite to that of a crankshaft in order to reduce vibration generated from the crankshaft.

For example, Patent Document 1 describes an example in which a balancer is disposed in front of a crankcase. In this example, a disposition configuration is one in which a front end of the crankcase protrudes forward by a length equivalent to a balancer shaft weight and a balancer shaft driving gear.

[Patent Document 1] Japanese Laid-open Patent Publication No. 2005-16511

In a motorcycle described in Patent Document 1, the front end of the crankcase protrudes forward by the length equivalent to the balancer shaft weight and the balancer shaft driving gear, and if an exhaust pipe is to be put in front of the crankcase, for example, the exhaust pipe is forced to bypass substantially. As a result, there are problems such that a freedom degree of disposition of the exhaust pipe is low and further that a vehicle body is long in a front and rear direction.

SUMMARY OF THE INVENTION

In consideration of the aforementioned circumstances, an object of the present invention is to provide a motorcycle in which a freedom degree of disposition of an exhaust pipe can be improved effectively.

A motorcycle of the present invention has: an engine having a crankcase containing a crank shaft and a balancer shaft, and a cylinder and a cylinder head positioned above the crankcase; and an exhaust pipe extending from the cylinder head, wherein the balancer shaft is positioned in front of the crank shaft, and wherein the crankcase has a balancer shaft housing supporting the balancer shaft thereinside and has a recessed part depressed rearward in a front end center part of the balancer shaft housing.

Further, in the motorcycle of the present invention, the balancer shaft has balancer shaft weights apart from each other in one side and in the other side in an axis direction thereof.

Further, in the motorcycle of the present invention, the exhaust pipe runs through an inner side of the recessed part of the balancer shaft housing and a part thereof overlaps the balancer shaft housing in vehicle body side view.

Further, the motorcycle of the invention has a turbo charger connected to the exhaust pipe and driven by an exhaust flow thereof, and compressing and supplying intake air to the engine, wherein the turbo charger is positioned in a front lower part of the engine and below the balancer shaft, and wherein a part of an exhaust flow introducing port to the turbo charger is positioned more rear than a front end of the balancer shaft housing in vehicle side view.

DETAILED DESCRIPTION OF THE PREFERRED EMBODIMENTS

Hereinafter, a preferred embodiment in a motorcycle according to the present invention will be described with reference to the drawings.

Figure 1:
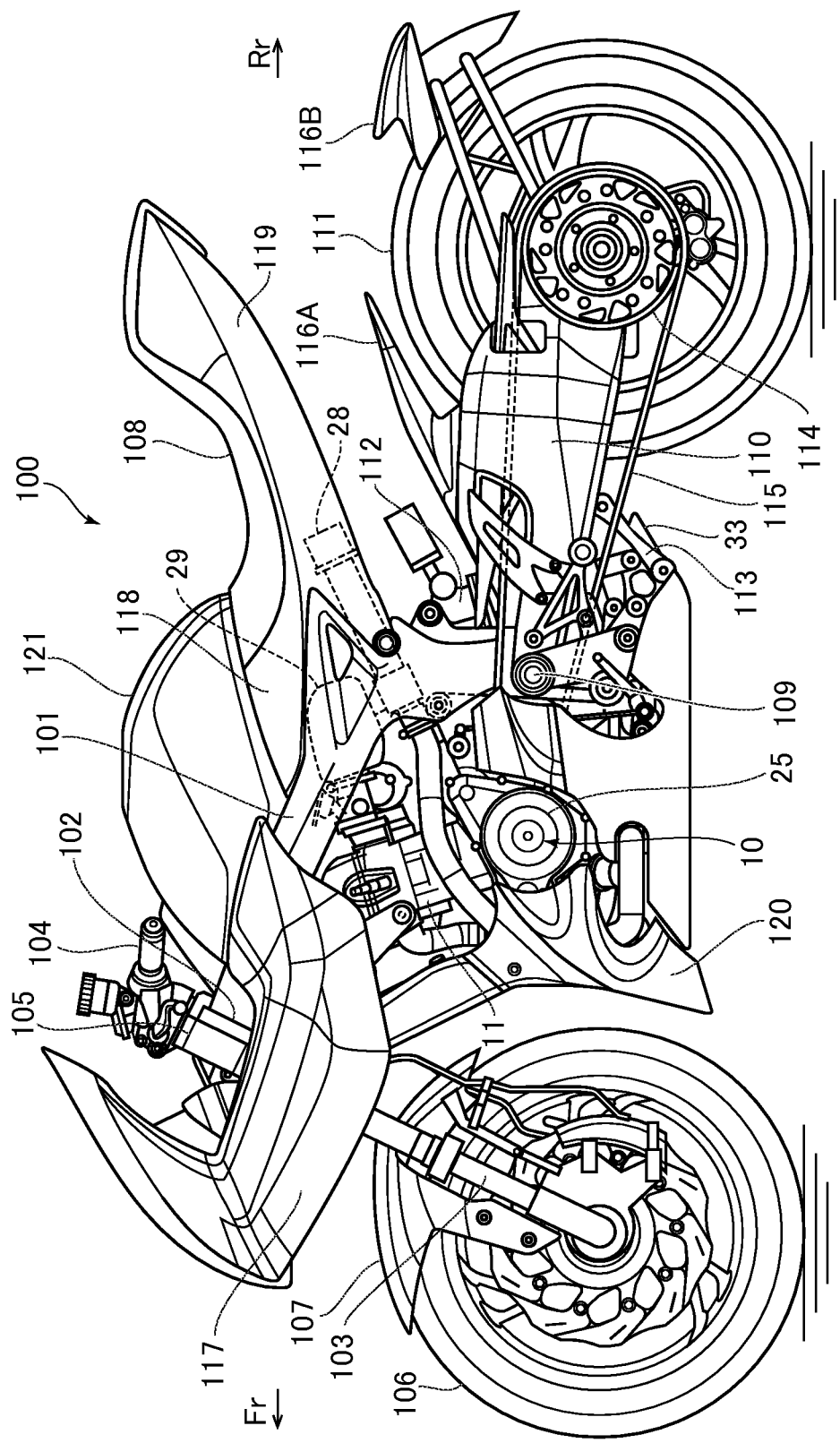
FIG. 1 is a side view of a motorcycle according to an embodiment of the present invention.
Figure 2:
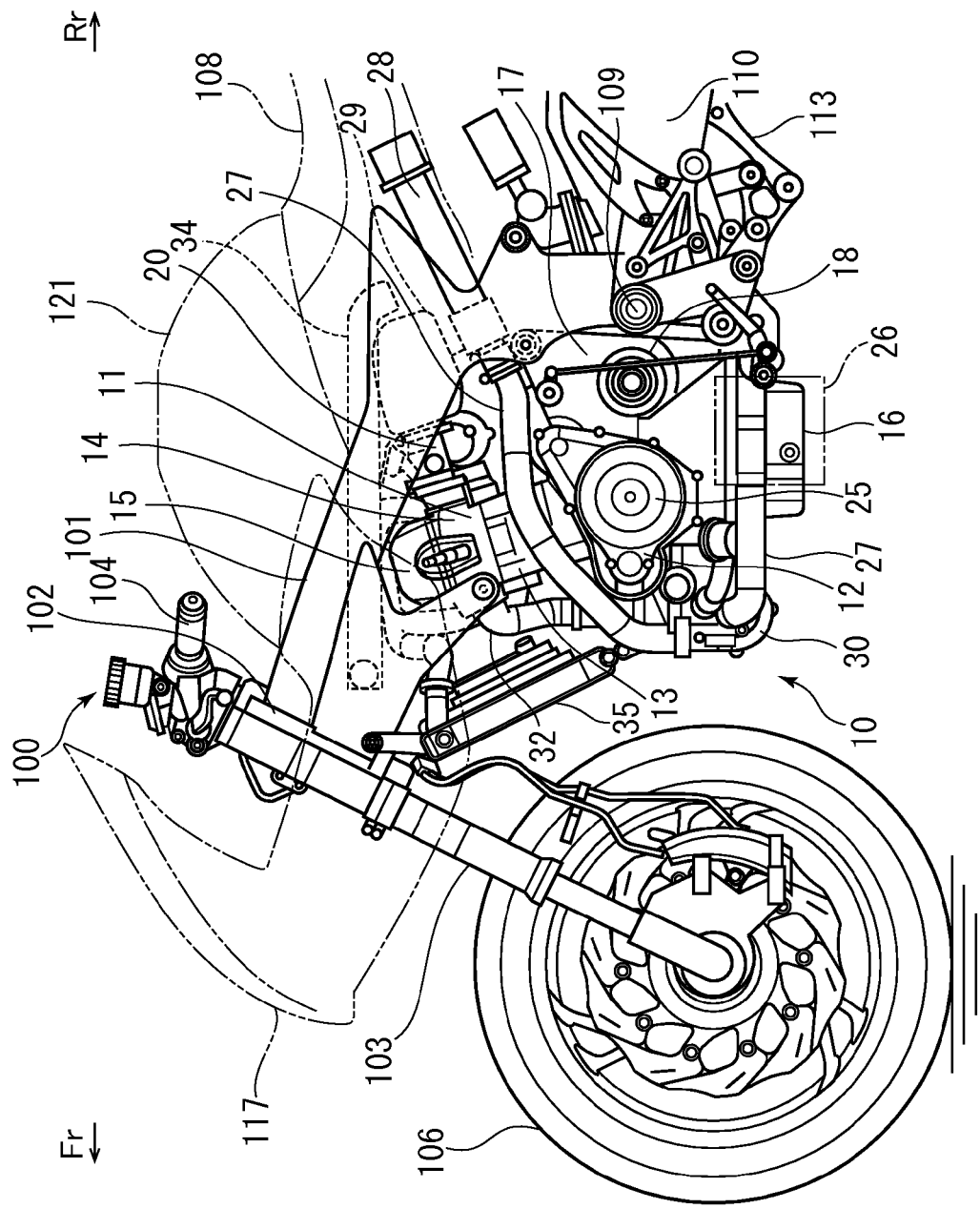
FIG. 2 is a side view of the motorcycle according to the embodiment of the present invention in a state where the exterior is removed.
Figure 3:
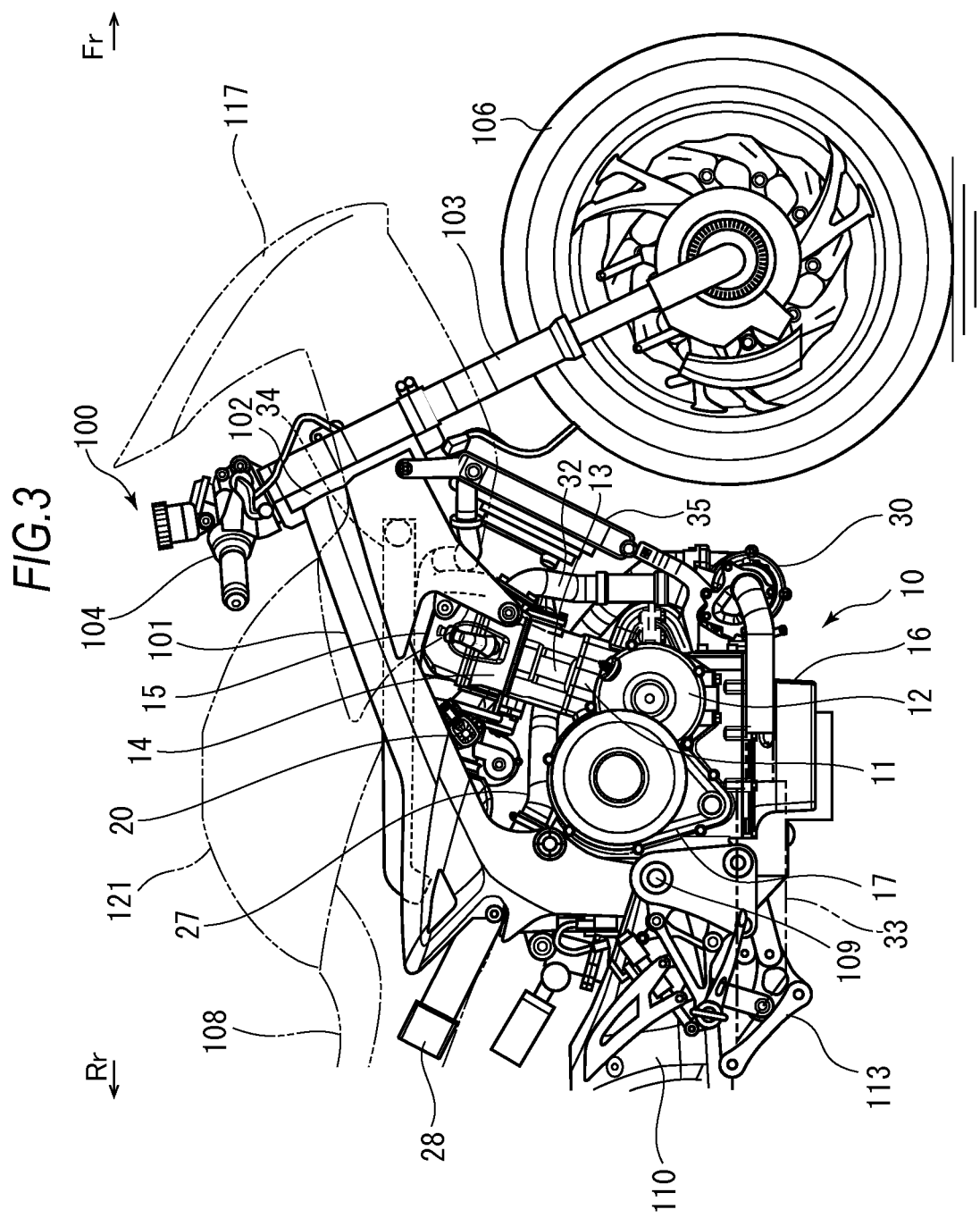
FIG. 3 is a side view of the motorcycle according to the embodiment of the present invention in a state where the exterior is removed.

FIG. 1 to FIG. 3 show a schematic configuration of a motorcycle 100 as an application example of the present invention, FIG. 1 being a side view of an entire vehicle, and FIG. 2 and FIG. 3 each being a side view of a state where the exterior is removed. First, an entire configuration of the motorcycle 100 will be described by using the above drawings. Note that in the drawings including FIG. 1 to FIG. 3 used in the following explanation, a front of the vehicle is indicated by an arrow Fr, a rear of the vehicle is indicated by an arrow Rr, a lateral right side of the vehicle is indicated by an arrow R, and a lateral left side of the vehicle is indicated by an arrow L, as necessary.

In FIG. 1 to FIG. 3, a front part of a vehicle body frame 101 (a main frame) made of steel or an aluminum alloy material is provided with right and left two front forks 103 supported pivotably in right and left by a steering head pipe 102. A handle bar 104 is fixed to upper ends of the front forks 103 via a steering bracket 105. A front wheel 106 is rotatably supported by lower parts of the front forks 103, and a front fender 107 is fixed in a manner to cover an upper part of the front wheel 106.

The vehicle body frame 101 is integrally connected with a rear part of the steering head pipe 102, branches into two in a right and left pair toward the rear, and extends from the steering head pipe 102 toward rear downward while widening. In the present example, the vehicle body frame 101 can be what is called a twin spar type frame preferably adopted by a vehicle or the like which a high speed performance is required of. Note that, though not shown, a seat rail extends rearward properly at a slant rising higher at the rear, from a vicinity of a rear part of the vehicle body frame 101, and supports a seat 108 (a seating seat). Further, the right and left of the vehicle body frame 101 are connected with each other while being curved or bent downward in a vicinity of a rear end thereof, and the vehicle body frame 101 as a whole has a three-dimensional structure inside which a space is formed.

A swing arm 110 is connected with the vicinity of a lower part of the rear end of the vehicle body frame 101 via a pivot shaft 109, in a swingable manner in an up and down direction. A rear wheel 111 is rotatably supported by a rear end of the swing arm 110. In this example, the rear wheel 111 is supported in a rear part side of the swing arm 110 in a cantilever style. A rear shock absorber 112 is mounted between the vehicle body frame 101 and the swing arm 110, and a lower end side of the rear shock absorber 112 in particular is coupled to both vehicle body frame 101 and swing arm 110 via a link mechanism 113. A driven sprocket 114 around which a chain 115 transmitting a motive power of an engine described later is wound is rotatably attached to the rear wheel 111, and the rear wheel 111 is rotation-driven via the driven sprocket 114. Directly around the rear wheel 111 are provided rear fenders 116A, 116B covering a vicinity of a front upper part and a rear upper part, respectively.

In the vehicle exterior, mainly the front part and right and left side parts of the vehicle are covered by cowlings, respectively, that is, by a half cowl 117 and a side cowl 118, in this example, respectively. Further, in a vehicle rear part, a seat cover or a seat cowl 119 is adhered around the seat 108. Further, an under cowl 120 covering a neighborhood of a lower part of a later-described engine is had, and an appearance form of the vehicle having what is called a streamline shape is formed by such exterior members. Note that a fuel tank 121 is mounted in a front side of the seat 108.

Figure 4:
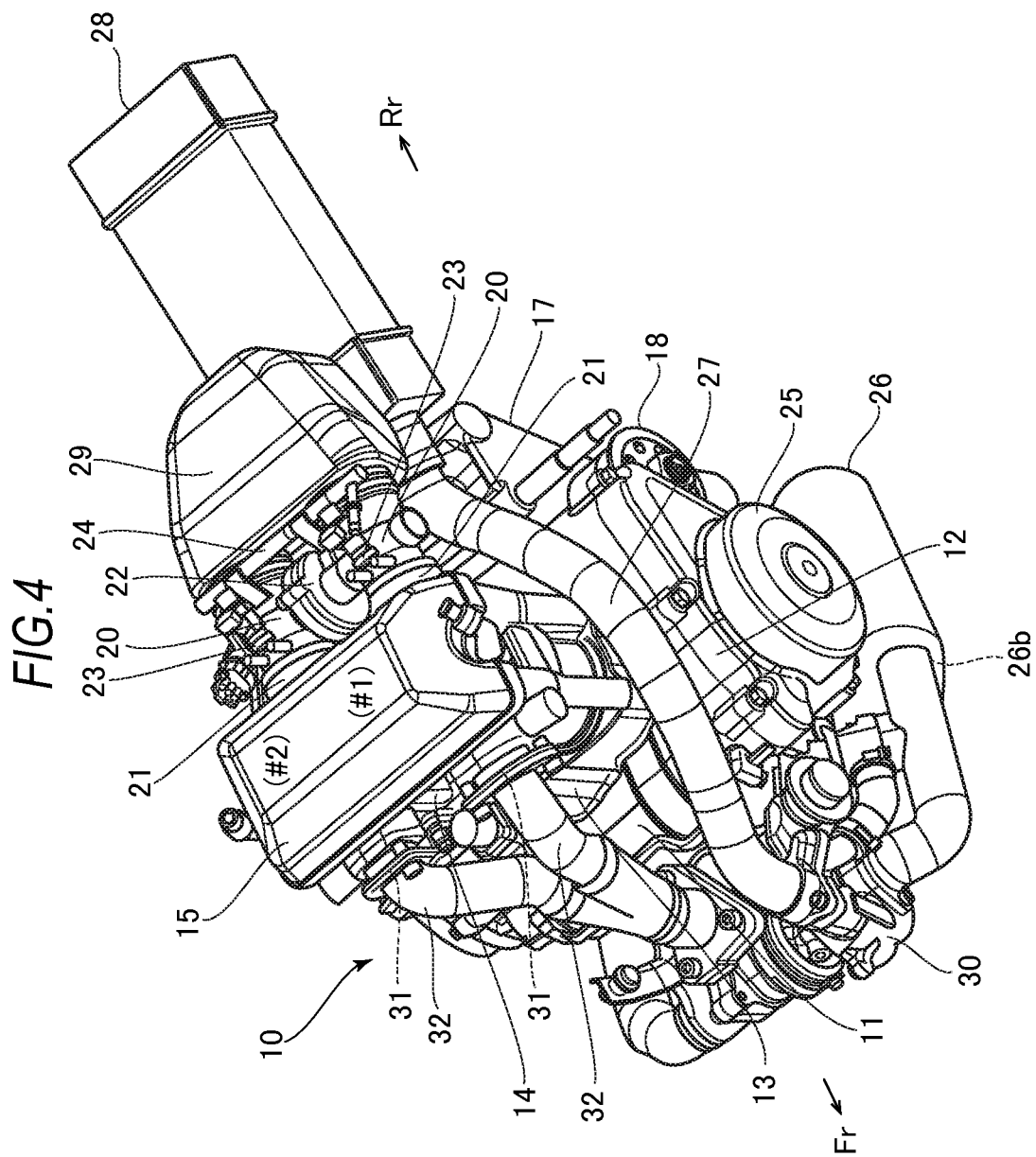
FIG. 4 is a perspective view showing an engine unit according to the embodiment of the present invention.
Figure 5:
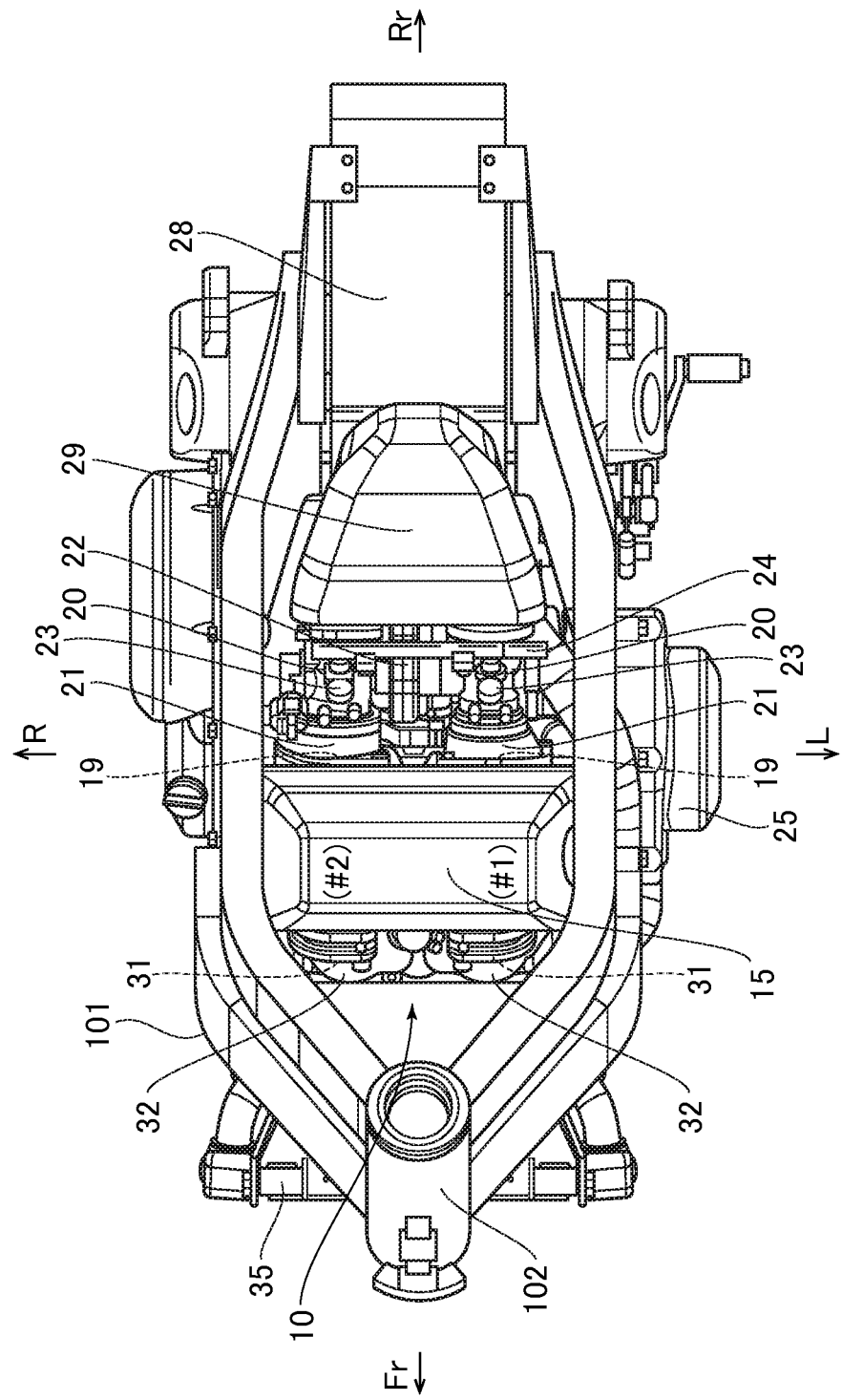
FIG. 5 is a top view of a neighborhood of the engine unit according to the embodiment of the present invention.

An engine unit 10 is mounted in an almost vehicle center part of the motorcycle 100. FIG. 4 shows a principal configuration of the engine unit 10. Next, the engine unit 10 will be described with reference also to FIG. 4 to FIG. 6. The engine unit 10 has an engine 11, and a water-cooled multi-cylinder four-cycle gasoline engine is used in the present embodiment. The engine 11 is a parallel two-cylinder engine having a first (#1) cylinder and a second (#2) cylinder provided in parallel in right and left (in a vehicle width direction), and above a crankcase 12 housing a crank shaft supported horizontally in right and left, a cylinder 13, a cylinder head 14, and a cylinder head cover 15 are integrally connected in sequence in an overlapping manner (FIG. 4), and an oil pan is attached to a lowest part. Note that a cylinder axis of the engine 11 is disposed while being properly inclined forward. Such an engine 11 is suspended by the vehicle body frame 101 via a plurality of engine mounts, so as to be integrally connected and supported inside the vehicle body frame 101 and acts as a rigid member itself of the vehicle body frame 101.

A transmission case 17 is integrally formed at a rear part of the crankcase 12 (see FIG. 2 and the like), and a not-shown counter shaft and a plurality of transmission gears are disposed in the transmission case 17. The motive power of the engine unit 10 is transmitted from the crank shaft, passing through a transmission, finally to a drive sprocket 18 being an output end thereof (see FIG. 4 and the like), and the drive sprocket 18 rotation-drives a driven sprocket 114, thus the rear wheel 111, via the motive power transmission chain 115 (FIG. 1).

Note that the crankcase 12 and the transmission case 17 are integrally connected with each other, and constitute, as a whole, a casing assembly of the engine unit 10. A plurality of auxiliary machines and the like, such as a starter motor for engine start and a clutch device, is mounted or connected in places of the casing assembly, and the entire engine unit 10 including the above is supported by the vehicle body frame 101.

To the engine 11 are further attached an intake system supplying an air-fuel mixture made of air (intake air) and fuel supplied from an air cleaner and a fuel supply system (which will be described later), respectively, an exhaust system discharging exhaust gas after combustion from the engine 11, a cooling system cooling the engine 11, and a lubricating system lubricating a movable part of the engine 11, and further, an engine control unit (ECU) which operates and controls the above. A plurality of functional systems collaborates with the aforementioned auxiliary machines and the like by control of the engine control unit, and thereby, a smooth operation as the engine unit 10 as a whole is carried out.

More concretely, first, in the intake system, an intake port 19 (whose approximate position is outlined by a dotted line in FIG. 5) is opened in a rear side of the cylinder head 14 in each of the #1 and #2 cylinders, and a throttle body 20 is connected to the intake port 19 via an intake pipe 21. To the throttle body 20, there is attached a throttle valve (not shown) which opens/closes an intake air flow channel or path formed inside the throttle body 20 in correspondence with an accelerator opening degree, and a flow amount of air supplied from the later-described air cleaner is controlled. In this example, throttle valve axes of the #1 and #2 cylinders are disposed coaxially, and a valve driving mechanism 22 driving the throttle valve axes mechanically, electrically, or electromagnetically is had.

On the other hand, in each throttle body 20, an injector 23 for fuel injection is disposed in a downstream side of the throttle valve, and fuel in the fuel tank 121 is supplied to the injector 23 by a fuel pump. In this case, each injector 23 is connected to a delivery pipe 24 laterally mounted in the vehicle width direction in an upper side thereof, and fuel is delivered from the delivery pipe 24 connected to the fuel pump. Each injector 23 injects fuel to the intake air flow channel in the throttle body 20 at a predetermined timing by control of the aforementioned engine control unit, and thereby an air-fuel mixture of a predetermined air-fuel ratio is supplied to the cylinder 13 of the #1 and #2 cylinders.

Figure 6:
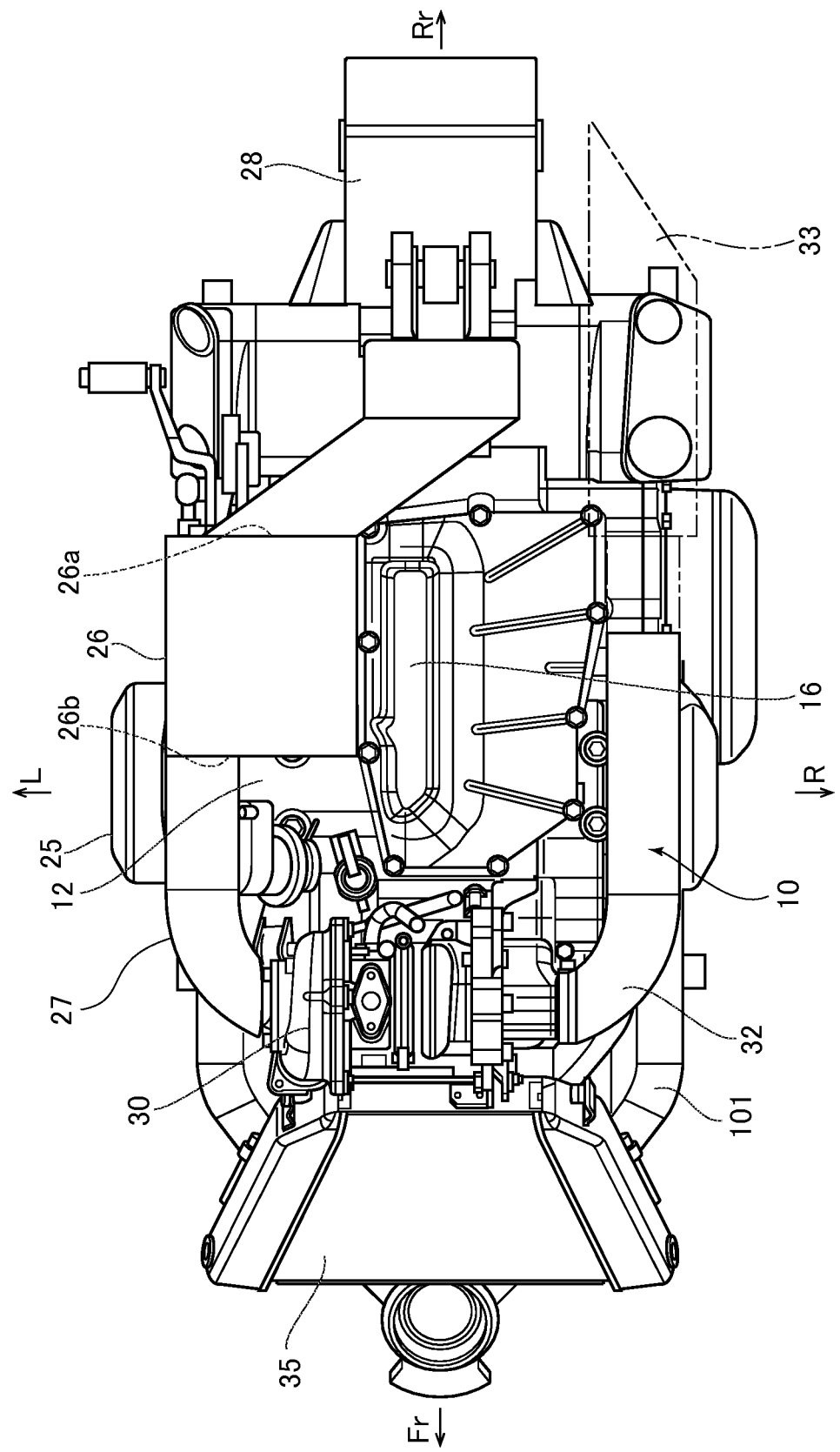
FIG. 6 is a bottom view of the neighborhood of the engine unit according to the embodiment of the present invention.
Figure 7:
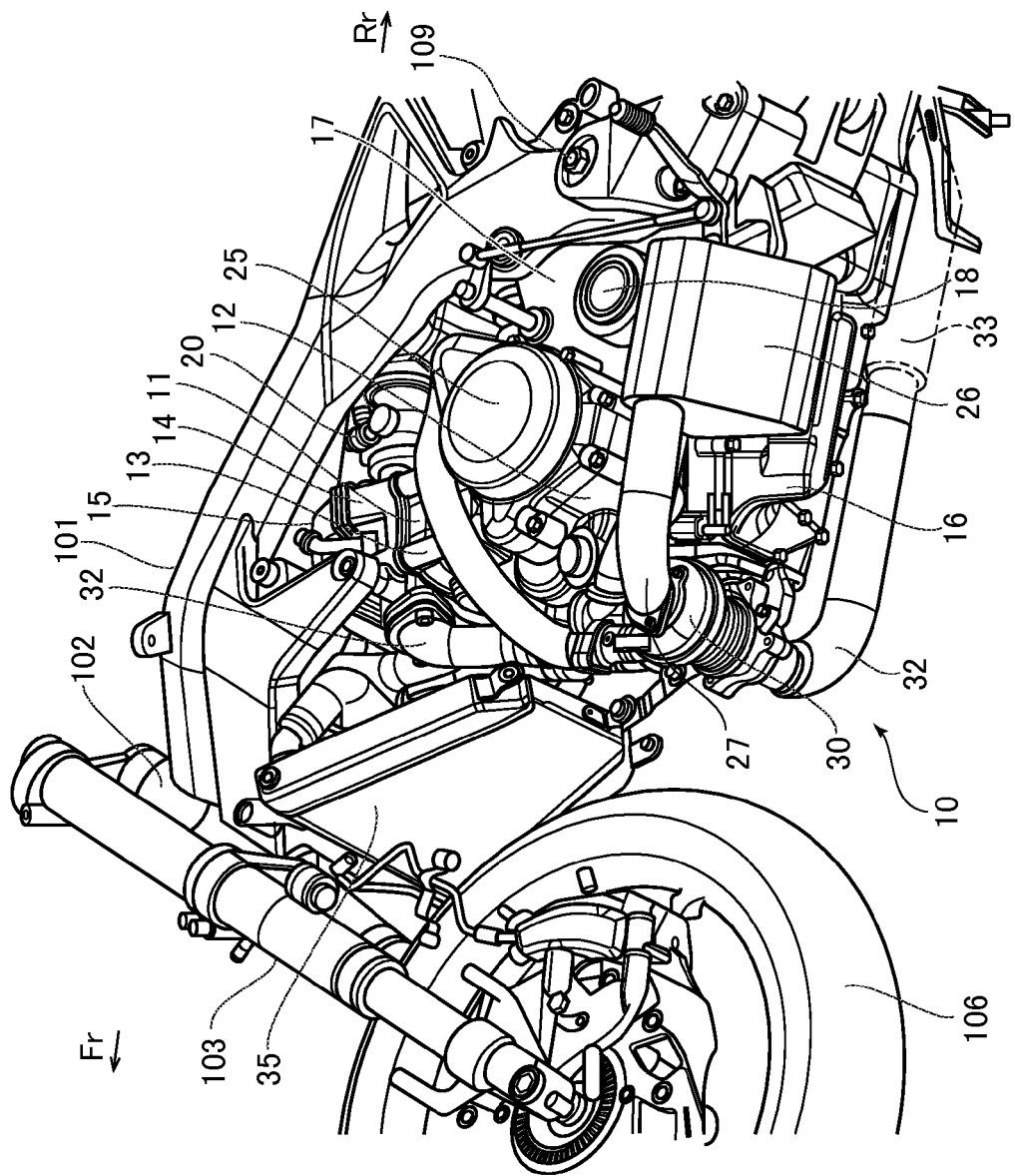
FIG. 7 is a downward perspective view of a front part of the motorcycle according to the embodiment of the present invention.
Figure 8:
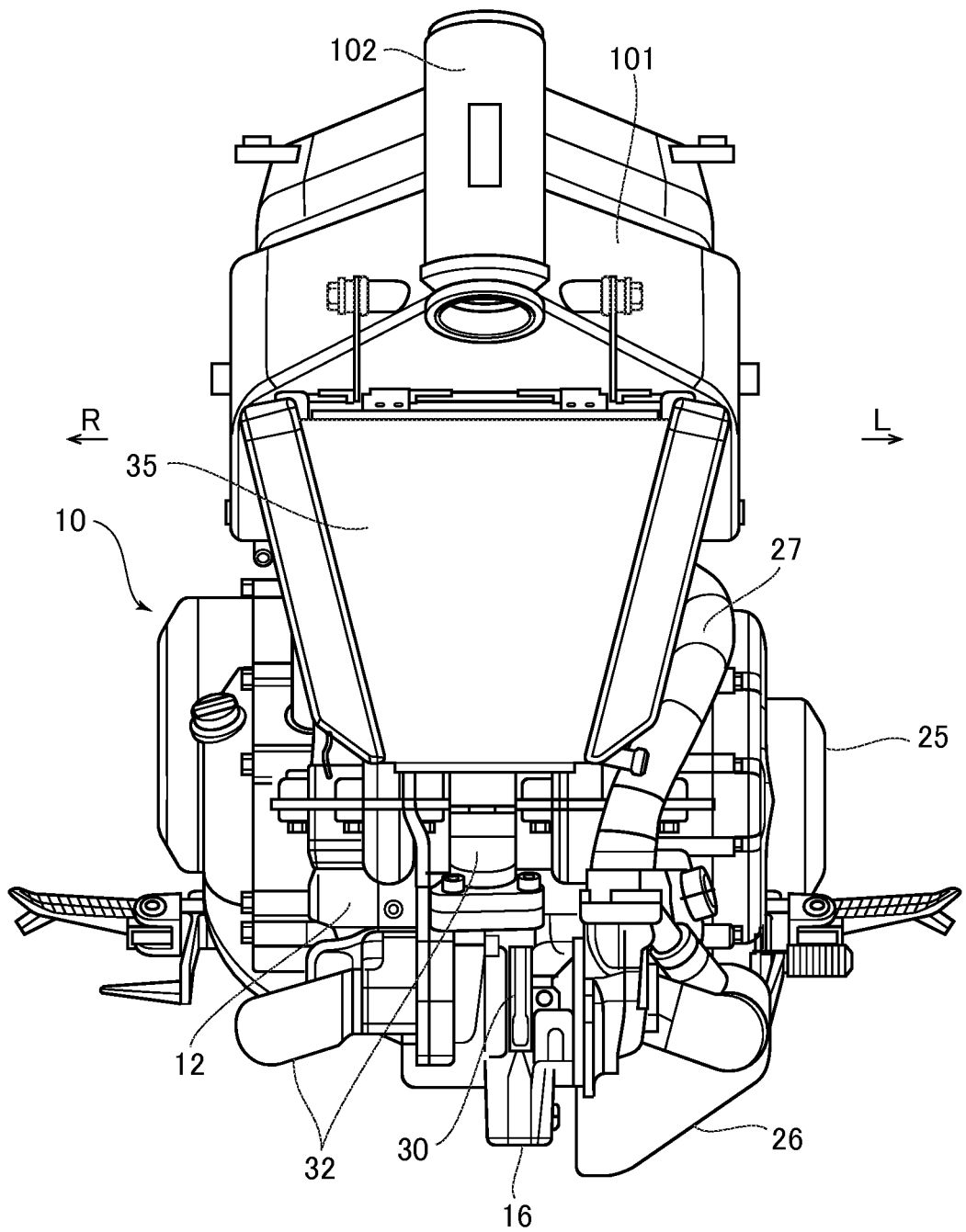
FIG. 8 is a front view of the engine unit according to the embodiment of the present invention.

Here, as shown in FIG. 4 or FIG. 6, the air cleaner 26 is disposed adjacently at a predetermined interval at a lower part of the engine 11, that is, below a magneto chamber 25 provided in a left side of the crankcase 12 and in a left side direction of the oil pan 16. The air cleaner 26 has a box-shaped air cleaner box whose left side surface is inclined inward toward a bottom, as shown in FIG. 7 or FIG. 8. An air filter is installed in the air cleaner box and the air taken into the air cleaner box is purified by the air filter. A flow-in port 26a for taking in air is opened in an air cleaner box rear surface part of the air cleaner 26 and a flow-out port 26b for the purified air is opened in an air cleaner box front surface part (whose approximate positions are each outlined by a dotted line in FIG. 6), and an air feed pipe 27 is connected to the flow-out port 26b. The air feed pipe 27 extends forward from the air cleaner 26, takes a roundabout path to the front of the crankcase 12 as shown in FIG. 4 and the like, thereafter curves upward, further runs through a left side of the cylinder 13 (#1 cylinder), and is connected to an intercooler 28 of an air cooled type in this example.

The intercooler 28 cools the air supplied from the air feed pipe 27, and the cooled air is supplied to the throttle bodies 20 of the #1 and #2 cylinders via a surge tank 29. In the present example, the intake system has a turbo charger 30 compressing intake air, the turbo charger 30 disposed in the middle of the air feed pipe 27, that is, in a front side of the engine 11. Since the air compressed by a compressor of the turbo charger 30 generates heat, such air reduces an intake efficiency of the engine 11 if left as it is. By cooling the air supplied from the turbo charger 30 by the intercooler 28 in an intake upstream side of the throttle body 20, the intake efficiency can be improved effectively. Note that by positioning the air cleaner 26 in a lateral lower part of the engine 11 to bring close to the turbo charger 30, a piping can be shortened.

Next, in the exhaust system, both #1 and #2 cylinders have exhaust ports 31 (whose approximate positions are outlined by dotted lines in FIG. 4) opened in a front side of the cylinder head 14, and exhaust pipes 32 are connected to the exhaust ports 31. The exhaust pipes 32 of the respective cylinders, as shown in FIG. 4, extend once downward from the exhaust ports 31 and join in a front side of the cylinder 13 and integrate. Thereafter, the exhaust pipe 32 takes a roundabout path to a right lower part of the crankcase 12, and further extends rearward as shown in FIG. 6. A muffler 33 (a part of which is shown in FIG. 1) is attached to a rear end of the exhaust pipe 32. In the present example, a driving part side of the turbo charger 30, that is, a turbine, is disposed in the middle of the exhaust pipe 32, and the compressor of the turbo charger 30 rotation-driven by the turbine is disposed in the middle of the air feed pipe 27. As described above, in the present embodiment, a turbo charger is adopted which pressurizes air fed from the air cleaner 26 and supplies to the intercooler 28, by using an exhaust flow of the engine 11.

Note that incidentally to the aforementioned intake system, an air introduction means introducing cooling air to the intercooler 28 is had. In this example, as schematically shown in FIG. 2 and FIG. 3 for example, there is had an air duct 34 extended in a front and rear direction below the fuel tank 121. The air duct 34 introduces air so that traveling air taken in from a front end part of the half cowl 117 is supplied in its front end part, and so that cooling air is supplied from its rear end part to the intercooler 28.

Further, though not shown in detail, in the cooling system, a water jacket formed so that the cooling water can circulate is constructed around a cylinder block including the cylinder 13. As shown in FIG. 7, FIG. 8, and the like, a radiator 35 cooling the cooling water fed to the water jacket is installed. In this example, the radiator 35 has a trapezoid shape whose upper end side is set longer than its bottom side in front view as shown in FIG. 8, and is extendedly disposed in a manner to be properly inclined rearward from a vicinity of a lower end of the steering head pipe 102 to a vicinity of a front of the crankcase 12 as shown in FIG. 2, FIG. 3, and the like. The cylinder block of the engine 11 is almost covered by the radiator 35 as shown in FIG. 8. Note that the radiator 35 is supported, in a front part of the engine unit 10, by using the vehicle body frame 101 or the like, by proper places thereof.

Further, the lubricating system for supplying lubricating oil to a movable part of the engine unit 10 to lubricate the movable part is constructed. The lubricating system includes, though not shown in detail either, a valve driving device constructed in the crank shaft or the cylinder head 14, a cam chain connecting the above, the transmission, and so on. In the present embodiment, a normal oil pump is used for the lubricating system, and the lubricating oil pumped up from the oil pan 16 by this oil pump is supplied to the lubricating system.

Here, a basic effect or the like in the present embodiment will be described. First, by having the turbo charger 30, practical displacement decrease and intake efficiency improvement, of the engine 11, can be planned simultaneously. In such a case, as a result that the intercooler 28 cools the air pressurized by the turbo charger 30, reduction of the intake efficiency is prevented, and improvement of fuel consumption and improvement of output are realized.

In addition to the above, as a result that the intercooler 28 is disposed adjacently to the surge tank 29, an air path therebetween can be shortened and a throttle response is improved. Further, a piping and the like can be reduced, which leads to weight saving and component number reduction. Further, as a result that the intercooler 28 is disposed behind the engine 11, a layout of a front side of the engine 11 where the radiator 35, the exhaust pipe 32, and the turbo charger 30 (mainly in a case of a turbo) are disposed can be facilitated.

Further, as a result that the turbo charger 30 is disposed in front of the intercooler 28, the turbo charger 30 is disposed in a vicinity of the engine 11, so that intake system components can be aggregated, and the piping can be shortened and simplified. Further, since component weights concentrate in a vehicle center part, operability of the vehicle is improved. In the present example, the turbo charger 30 which compresses the intake air by using the exhaust flow, that is, being what is called a turbo, is required to be disposed in front of the engine 11 adjacently to the exhaust pipe 32 extending from the front side of the cylinder 13, and disposing the intercooler 28 in the rear facilitates a layout of the front of the engine 11.

Further, in the intercooler 28, though not shown in detail, a flow-in port and a flow-out port of air are positioned in one side (a vehicle body front half part), and an air flow path thereinside has an approximate U-shape. As a result of a configuration in which the flow path of air turns back inside the intercooler 28 by the above, compared with a case where a turn-back type U-shape piping is provided, the intercooler 28 can be set broader by an area equivalent to an occupied area of the conventional U-shape piping. Thereby, a limited room or space in a lower side of the seat 108 can be utilized to the fullest, and thus a cooling efficiency of the intake air is improved and also the component number can be reduced.

Further, the intercooler 28 is positioned below the seat 108, and at least a part thereof is positioned in the rear in relation to a front end of the seat 108. As a result of disposing the intercooler 28 generating high-temperature exhaust hot wind below (directly under or in the rear of) the seat 108 by the above, the exhaust hot wind becomes hard to hit an occupant compared with a case where an intercooler is provided at the front of the seat 108, and comfortability of the occupant is improved.

Figure 9:
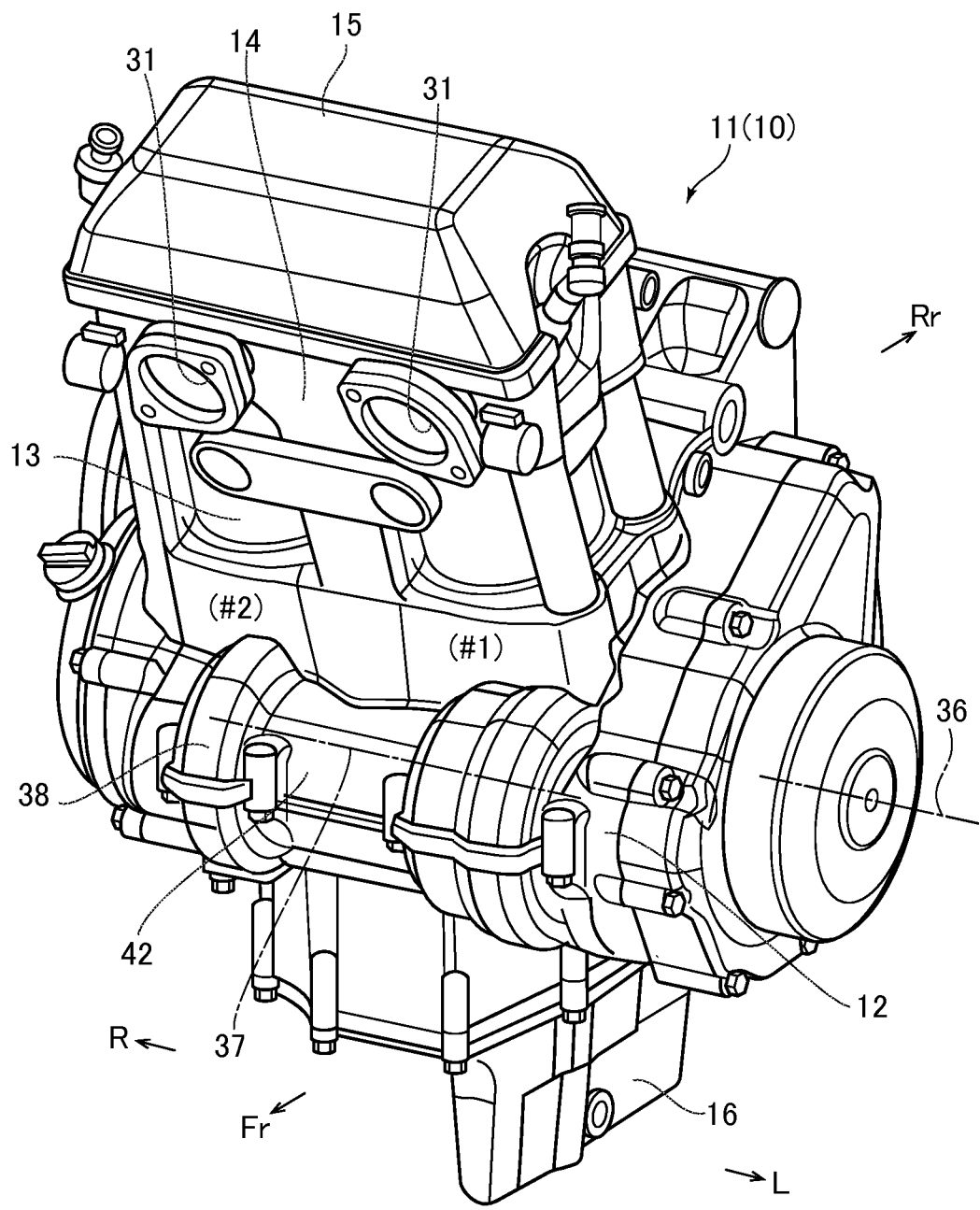
FIG. 9 is a perspective view showing a cylinder and a neighborhood of the crankcase of the engine unit according to the embodiment of the present invention.

In the motorcycle of the present invention, as described above, the turbo charger 30 is positioned in the front lower part of the engine 11, further in the engine 11 the cylinder 13 is positioned above the crankcase 12 as shown also in FIG. 9, and in the crankcase 12 the crank shaft 36 is horizontally supported in right and left (in the vehicle body direction). A balancer shaft 37 is had in front of the crank shaft 36 in particular. Note that by providing the balancer shaft 37, vibration generated from the crank shaft 36 is reduced or suppressed. To the crankcase 12, a balancer shaft housing 38 housing and supporting the balancer shaft 37 thereinside is integrally formed in a manner to protrude forward.

Figure 10:
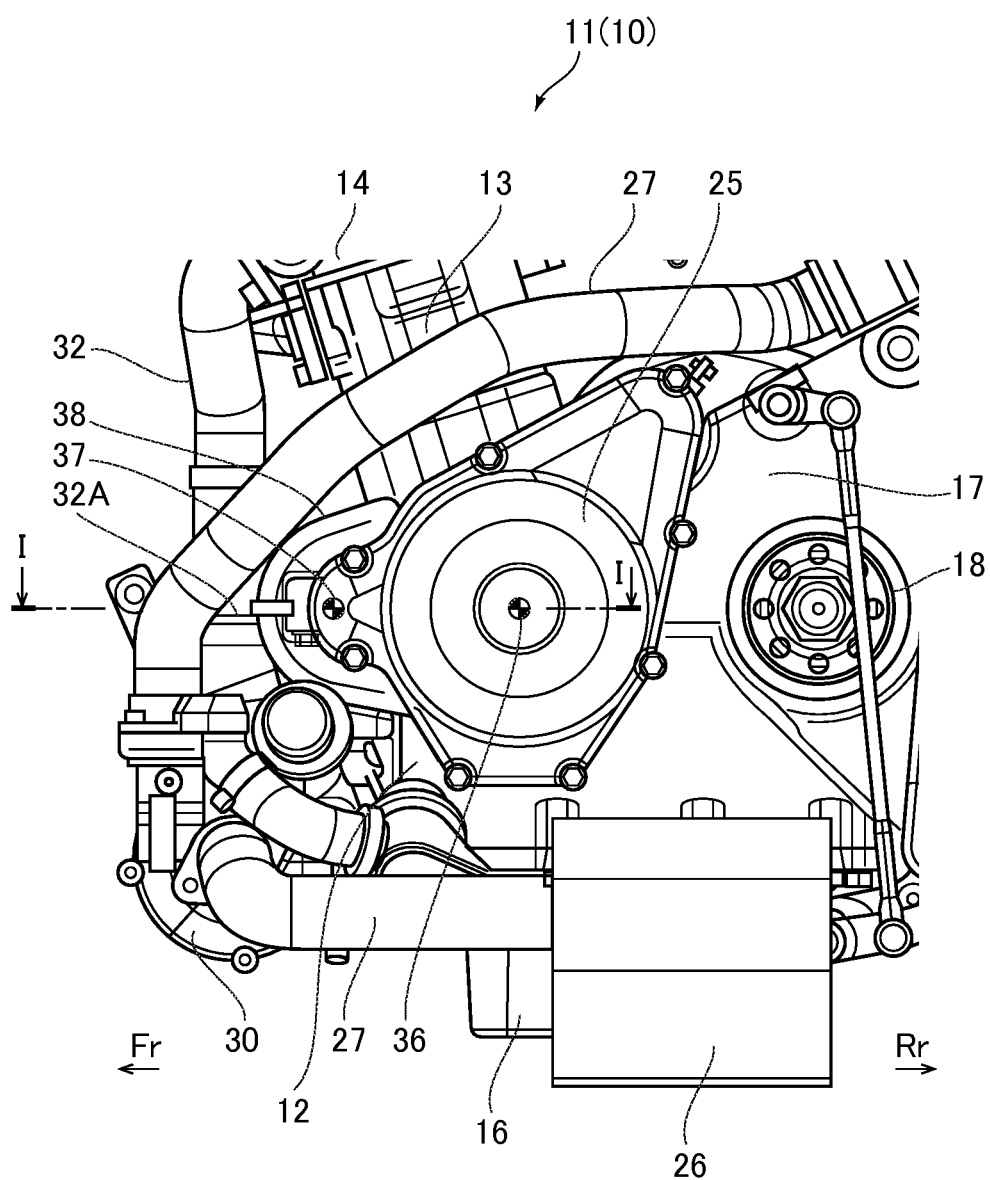
FIG. 10 is a left side view showing the neighborhood of the crankcase of the engine unit according to the embodiment of the present invention.
Figure 11:
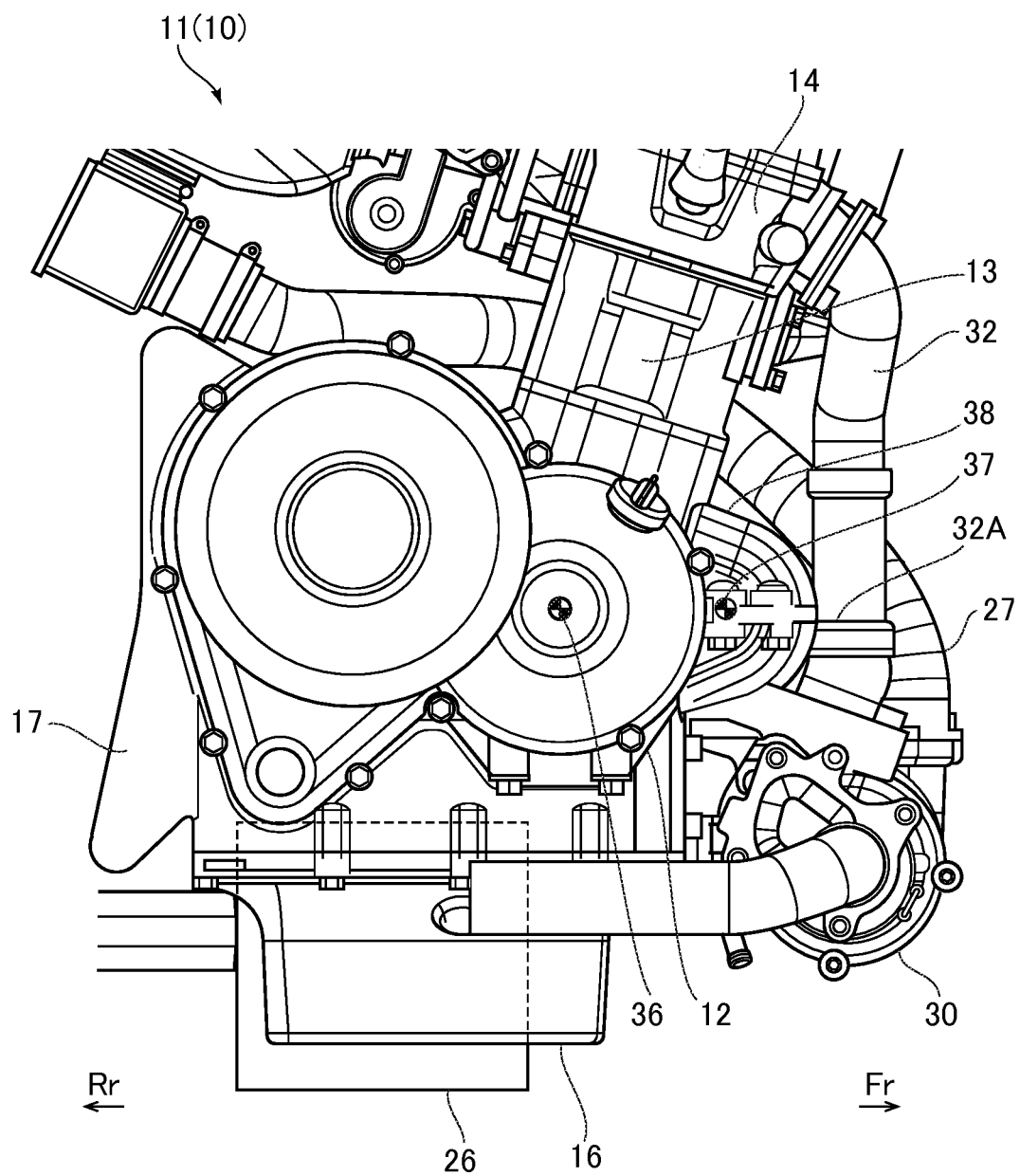
FIG. 11 is a right side view showing the neighborhood of the crankcase of the engine unit according to the embodiment of the present invention.

As approximately illustrated in FIG. 10 and FIG. 11, the balancer shaft 37 is disposed in parallel to the crank shaft 36 at a predetermined interval at practically the same height position as that of the crank shaft 36. The balancer shaft housing 38 protrudes in the front of the crankcase 12, and as shown in FIG. 10 and FIG. 11, a part of the exhaust pipe 32 overlaps the balancer shaft housing 38 in vehicle body side view.

Figure 12:
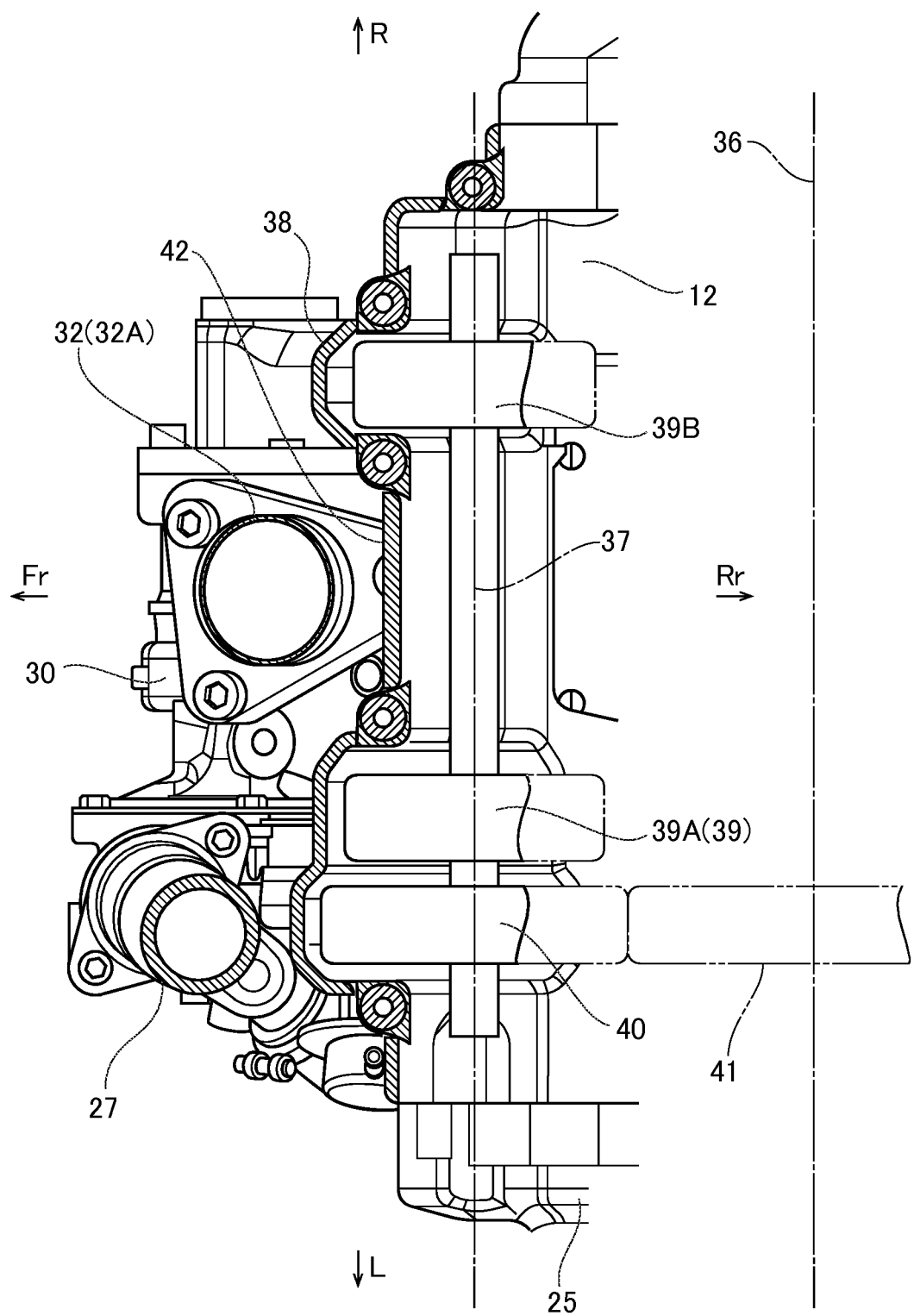
FIG. 12 is a cross-sectional view taken along a line T-T of FIG. 10.

Further, FIG. 12 shows a concrete configuration example of a neighborhood of the balancer shaft 37, and right and left end parts of the balancer shaft 37 are freely rotatably supported inside the balancer shaft housing 38 via not-shown bearings. The balancer shaft 37 has a balancer weight 39, and as the balancer weight 39, a balancer shaft weight 39A and a balancer shaft weight 39B which are apart from each other in one side (for example, left side) and in the other side (for example, right side) in an axis direction of the balancer shaft 37 are had. The balancer shaft weight 39A and the balancer shaft weight 39B are disposed almost in correspondence with the #1 and #2 cylinders in the vehicle width direction. Above the balancer shaft 37, a balancer shaft gear 40 is disposed adjacently in a left side of the balancer shaft weight 39A of the one side. The balancer shaft gear 40 is engaged with a driving gear 41 which is rotatably attached to the crank shaft 36, and thereby, the balancer shaft 37 is rotated by rotation of the crank shaft 36.

Further, the balancer shaft housing 38 has a recessed part 42 depressed rearward in a front end center part thereof. The recessed part 42 is formed positioned in an almost midpoint of the #1 and #2 cylinders, and the exhaust pipe 32 runs through an inner side of the recessed portion 42. Besides, a part of the exhaust pipe 32 overlaps the balancer shaft housing 38 in vehicle body side view as described above.

As described above, there is had the turbo charger 30 to which the exhaust pipe 32 is connected and driven by its exhaust flow and which compresses intake air and supplies to the engine 11. As shown in FIG. 11 and the like, a part of an exhaust flow introducing port 32A to the turbo charger 30 is positioned more rear than a front end of the balancer shaft housing 38 in vehicle body side view.

Next, major effects and the like in the motorcycle with turbo charger of the present invention will be described. First, the exhaust pipes 32 extend downward from the cylinder heads 14 of the engine 11, and join in a front side of the cylinder 13. The turbo charger 30 being what is called a turbo, which acts by using the exhaust flow of such a discharge pipe 32 is required to be disposed adjacently to the discharge pipe 32. In the present invention, the balancer shaft 37 is had in front of the crank shaft, and the balancer shaft housing 38 housing the balancer shaft 37 is integrally formed at the front of the crankcase 12. As a result that the recessed portion 42 depressed rearward is had in the front end center part of the balancer shaft housing 38, and that, in a front face of the crankcase 12, a portion corresponding to a center of the balancer shaft 37 in the vehicle width direction is depressed, the space in front of the crankcase 12 is broadened, and a layout of the exhaust pipe 32 and the like in particular is facilitated.

In a case where the exhaust pipes 32 gather together and have a large diameter before reaching the turbo charger 30 as in the present example, the crankcase 12 being depressed in a center facilitates disposition of the exhaust pipe 32 in particular. As described above, by optimizing a shape of a balancer shaft holding part in front of the crankcase 12, that is, a shape of the balancer shaft housing 38, a freedom degree of disposition of the exhaust pipe 32 can be improved.

In such a case, the balancer shaft 37 has the balancer shaft weight 39A and the balancer shaft weight 39B apart from each other in the vehicle width direction. By depressing a part positioned at a middle of the balancer shaft weight 39A and the balancer shaft weight 39B, the recessed portion 42 is formed, so that the exhaust pipe 32 or the like can be disposed efficiently in the space of the recessed portion 42 even though the balancer shaft weight 39 is provided.

On that occasion, the balancer shaft weight 39A and the balancer shaft weight 39B are disposed dispersedly in right and left. Here, if a single balancer shaft weight is provided, the balancer shaft weight has a large diameter and makes a neighborhood of the front part of the crankcase 12 bulky, so that a layout of the other components is restricted if left as it is. In the present example, the balancer shaft weight 39 is dividedly constructed into two and the individual balancer shaft weight 39A and balancer shaft weight 39B can have small diameters, and thus the neighborhood of the front part of the crankcase 12 can be made compact. Further, two balancer shaft weight 39A and balancer shaft weight 39B including the balancer shaft gear 40 as a whole are disposed to have a good weight balance in right and left, so that driving stability of the vehicle is assured.

Further, since the exhaust pipe 32 runs through the inner side of the recessed portion 42 of the balancer shaft housing 38, by a part thereof overlapping the balancer shaft housing 38 in vehicle side view, the exhaust pipe 32 extends downward in a manner to go along the cylinder 13 and the crankcase 12, so that protruding of the exhaust pipe 32 toward the front can be suppressed. Thereby, compactness is attained as an engine component, and operability of the vehicle is improved by intensive disposition of heavy objects. Further, components positioned more front than the engine 11, such as the front wheel 106, can be disposed closer to the engine 11 side, so that a wheel base is shortened to improve vehicle operability.

Further, a part of the exhaust flow introducing port 32A to the turbo charger 30 is positioned more rear than the front end of the balancer shaft housing 38 in vehicle body side view. As a result that the exhaust pipe 32 creeps along the crankcase 12, the exhaust pipe 32 reaches the turbo charger 30 without bypassing the front of the balancer shaft housing 38, in a shape with comparatively less curve. Thereby, exhaust resistance in the exhaust pipe 32 is reduced to enable the turbine of the turbo charger 30 to rotate more powerfully, so that a capacity of the turbo charger 30 is improved.

According to the present invention, as a result that a front end center part of a balancer shaft housing is depressed, a recessed portion which is depressed rearward is formed, a space in front of the crankcase is broadened, so that a layout of an exhaust pipe or the like in particular is facilitated. By optimizing a shape of a holding part of the balancer shaft at the front of the crankcase, it becomes possible to improve a freedom degree of disposition of the exhaust pipe.

Although various embodiments of the present invention have been described hereinabove, it should be understood that the present invention is not limited to these embodiments and various changes and the like could be made within the scope of the invention.

In the above-described embodiment, it is possible to make not only the exhaust 32 but also another component such as a cooling water hose run through the recessed part 42 of the balancer shaft housing 38.

Further, the above-described embodiment is described in the example of the water-cooled parallel two-cylinder engine, the number of cylinders, cylinder disposition, a cooling system, or the like of the engine 11 can be selected accordingly, and the above-described embodiment is also applicable to an air-cooled engine of three or more cylinders.

What is claimed is:

1. A motorcycle comprising:
a two-cylinder engine comprising a crankcase containing a crank shaft and a balancer shaft, and a first and second cylinder and a first and second cylinder head positioned above the crankcase;
an exhaust pipe extending from the cylinder head; and
a turbo charger connected to said exhaust pipe and driven by an exhaust flow thereof, and compressing and supplying intake air to said engine,
wherein the balancer shaft is positioned in front of the crank shaft,
wherein the crankcase comprises a balancer shaft housing supporting the balancer shaft thereinside and has a recessed part depressed rearward in a front end center part of the balancer shaft housing
wherein said turbo charger is positioned in a front lower part of said engine and below the balancer shaft,
wherein a part of an exhaust flow introducing port to said turbo charger is positioned more rear than a front end of the balancer shaft housing in vehicle side view,
wherein the exhaust flow introducing port is positioned in an upper portion of said turbo charger which is connected with said exhaust pipe,
wherein a joint part of exhaust pipes in an upstream side of a turbine of said turbo charger is disposed to run through the recessed part,
wherein a bottom part of the recessed part is positioned more rear than a front end of a balancer weight and between the two balancer weights which are disposed adjacently in an axis direction of the balancer shaft, and
wherein the recessed part is positioned at an approximate midpoint between the first cylinder and the second cylinder.

2. The motorcycle according to claim 1,
wherein the balancer shaft comprises balancer shaft weights apart from each other in one side and in the other side in an axis direction thereof.

3. The motorcycle according to claim 1,
wherein said exhaust pipe runs through an inner side of the recessed part of the balancer shaft housing and a part thereof overlaps the balancer shaft housing in vehicle body side view.

4. The motorcycle according to claim 2,
wherein said exhaust pipe runs through an inner side of the recessed part of the balancer shaft housing and a part thereof overlaps the balancer shaft housing in vehicle body side view.

* * * * *